US007375916B2

(12) United States Patent
Semba et al.

(10) Patent No.: US 7,375,916 B2
(45) Date of Patent: May 20, 2008

(54) MAGNETIC RECORDING DISK DRIVE WITH MULTIPLE FEEDFORWARD CONTROLLERS FOR ROTATIONAL VIBRATION CANCELLATION

(75) Inventors: Tetsuo Semba, San Jose, CA (US); Matthew T. White, Mountain View, CA (US); Kevin I. Tzou, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 306 days.

(21) Appl. No.: 11/378,459

(22) Filed: Mar. 17, 2006

(65) Prior Publication Data

US 2007/0217052 A1 Sep. 20, 2007

(51) Int. Cl.
*G11B 5/596* (2006.01)
(52) U.S. Cl. .................................... 360/77.04
(58) Field of Classification Search ............ None
See application file for complete search history.

(56) References Cited

U.S. PATENT DOCUMENTS

| | | | |
|---|---|---|---|
| 5,521,772 A | 5/1996 | Lee et al. | |
| 5,663,847 A | 9/1997 | Abramovitch | |
| 6,414,813 B2 | 7/2002 | Cvancara | |
| 6,487,028 B1 * | 11/2002 | Sri-Jayantha et al. | 360/77.04 |
| 6,496,320 B1 | 12/2002 | Liu | |
| 6,549,349 B2 * | 4/2003 | Sri-Jayantha et al. | 360/77.02 |
| 6,580,579 B1 | 6/2003 | Hsin et al. | |
| 6,650,499 B1 * | 11/2003 | Kusumoto | 360/77.04 |
| 6,690,534 B2 * | 2/2004 | Ding et al. | 360/77.02 |
| 6,710,966 B1 | 3/2004 | Codilian et al. | |

(Continued)

OTHER PUBLICATIONS

Abramovitch, "Rejecting Rotational Disturbances on Small Disk Drives Using Rotational Accelerometers," Proc of the 1996 IFAC World Cong, San Fran, CA, Jul. 1996, pp. 1-6.

(Continued)

*Primary Examiner*—Hoa T. Nguyen
*Assistant Examiner*—James L Habermehl
(74) *Attorney, Agent, or Firm*—Thomas R. Berthold (57) ABSTRACT

A disk drive has multiple feedforward controllers for handling external disturbances, such as rotational vibration (RV), that have different external disturbance frequency spectra. Each feedforward controller is designed to be optimal for a canceling a specific associated RV spectrum. The actual RV spectrum acting on the disk drive is determined and the proper feedforward controller is then selected and used to generate a compensation signal for canceling the RV. Each feedforward controller may be tested when the disk drive is experiencing the RV, and the resulting compensation signal and PES measured. The feedforward controller that produces the best external disturbance cancellation is then selected as the feedforward controller. A signal from a RV sensor may be used to detect the peak frequency of the actual RV spectrum. This detected peak frequency is then matched to a peak frequency in a plurality of peak frequencies in a lookup table, and the feedforward controller associated with the matching peak frequency is selected as the feedforward controller.

22 Claims, 10 Drawing Sheets

U.S. PATENT DOCUMENTS

| | | | |
|---|---|---|---|
| 6,894,862 B2* | 5/2005 | Kusumoto | 360/77.04 |
| 6,958,882 B2* | 10/2005 | Kisaka | 360/78.04 |
| 7,035,037 B2* | 4/2006 | Tao et al. | 360/77.04 |
| 7,116,513 B1* | 10/2006 | Sun et al. | 360/77.02 |
| 7,145,746 B1* | 12/2006 | Hirano et al. | 360/77.04 |
| 7,177,113 B1* | 2/2007 | Semba et al. | 360/77.07 |
| 7,315,433 B2* | 1/2008 | Baek et al. | 360/78.09 |
| 7,330,332 B2* | 2/2008 | Baek et al. | 360/77.04 |
| 2002/0093754 A1* | 7/2002 | Zhang et al. | 360/77.04 |
| 2003/0161066 A1* | 8/2003 | Inoue et al. | 360/77.04 |
| 2007/0183076 A1* | 8/2007 | Baugh et al. | 360/75 |

OTHER PUBLICATIONS

Jinzenji et al., "Acceleration Feedforward Control Against Rotational Disturbance in Hard Disk Drives," IEEE Transactions on Magnetics, vol. 37, No. 2, Mar. 2001, pp. 888-893.

White et al., "Increased Disturbance Rejection in Magnetic Disk Drives by Acceleration Feedfoward Control," Proc of the 1996 IFAC World Cong, San Fran, CA, 1996, pp. 489-494.

* cited by examiner

MAGNETIC RECORDING DISK DRIVE WITH MULTIPLE FEEDFORWARD CONTROLLERS FOR ROTATIONAL VIBRATION CANCELLATION

BACKGROUND OF THE INVENTION

1. Field of the Invention

This invention relates generally to disk drives, and more particularly to a magnetic recording disk drive that includes a system for canceling the effects of rotational vibration.

2. Description of the Related Art

Magnetic recording hard disk drives (HDDs) use an actuator, typically a rotary voice-coil-motor (VCM) type of actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data.

Disk drives experience rotational vibration and disturbance forces during normal operation. These disturbances arise internally, such as from motion of the VCM actuator, as well as externally, such as from shocks to the frame supporting the disk drive or from the movement of other disk drives when the drives are mounted together in a disk array system.

Rotational vibration (RV) cancellation is a method that uses sensors (typically accelerometers) to detect rotational vibration and improve the PES by canceling the off-track motion induced by the rotational vibration. The RV sensor signal is input to a feedforward controller that creates a feedforward compensation signal that is summed with the control signal to the VCM actuator. The use of a RV sensor and feedforward compensation in this manner is well-known, as described by Jinzenji et al., "Acceleration Feedforward Control Against Rotational Disturbance in Hard Disk Drives," *IEEE Transactions on Magnetics*, Vol. 37, No. 2, March 2001, pp. 888-893; and M. T. White et al., "Increased Disturbance Rejection in Magnetic Disk Drives by Acceleration Feedforward Control," *Proceedings of the 13th Triennial IFAC World Congress*, Jun. 30-Jul. 5, 1996, San Francisco, Calif., pp. 489-494.

The spectral content of external disturbances from customer environments vary as a function of the disk drive mounting geometry, as well as the location of the disk drive and the number of adjacent disk drives if the disk drive is in a disk array system. Consequently, a single feedforward controller design for RV cancellation can not optimally reject such a wide variety of external disturbances. Thus what is typically used is a feedforward controller that provides the best disturbance rejection over a broad range of frequencies.

U.S. Pat. No. 5,663,847 describes a disk drive with a RV sensor and a feedforward controller whose gain is adapted to accommodate changes in RV sensor sensitivity, and a threshold detector for turning off the adaptive gain feature. U.S. Pat. No. 6,414,813 B2 describes a disk drive with a RV sensor and a feedforward controller with multiple sets of adjustable gains, where a gain set is selected if the RV sensor output and the PES exceed certain thresholds. U.S. Pat. No. 6,580,579 B1 describes a disk drive with a RV sensor and an adaptive filter that adjusts its parameters in real-time from the PES using an estimate of the VCM plant transfer function.

What is needed is a disk drive with an adaptive method for RV cancellation in which the best available feedforward controller design is selected based on the RV sensor signal or the PES.

SUMMARY OF THE INVENTION

The invention is a disk drive with multiple feedforward controllers for handling rotational vibration (RV) having different RV spectra. Each feedforward controller is designed to be optimal for a canceling a specific associated RV spectrum. The actual RV spectrum acting on the disk drive is determined and from this determination the proper feedforward controller is selected and used to generate a compensation signal for canceling the RV. In one approach for selecting the appropriate feedforward controller, each feedforward controller is tested when the disk drive is experiencing the RV, and the resulting compensation signal and PES are measured and stored in memory. The feedforward controller that produces the best external disturbance cancellation, e.g., the largest compensation signal or smallest PES, is then selected as the feedforward controller. In another approach for selecting the appropriate feedforward controller, the RV sensor signal is used to detect the peak frequency of the actual RV spectrum. This detected peak frequency is then matched to a peak frequency in a plurality of peak frequencies in a lookup table, and the feedforward controller associated with the matching peak frequency is selected as the feedforward controller.

For a fuller understanding of the nature and advantages of the present invention, reference should be made to the following detailed description taken together with the accompanying figures.

DETAILED DESCRIPTION OF THE INVENTION

Figure 1:
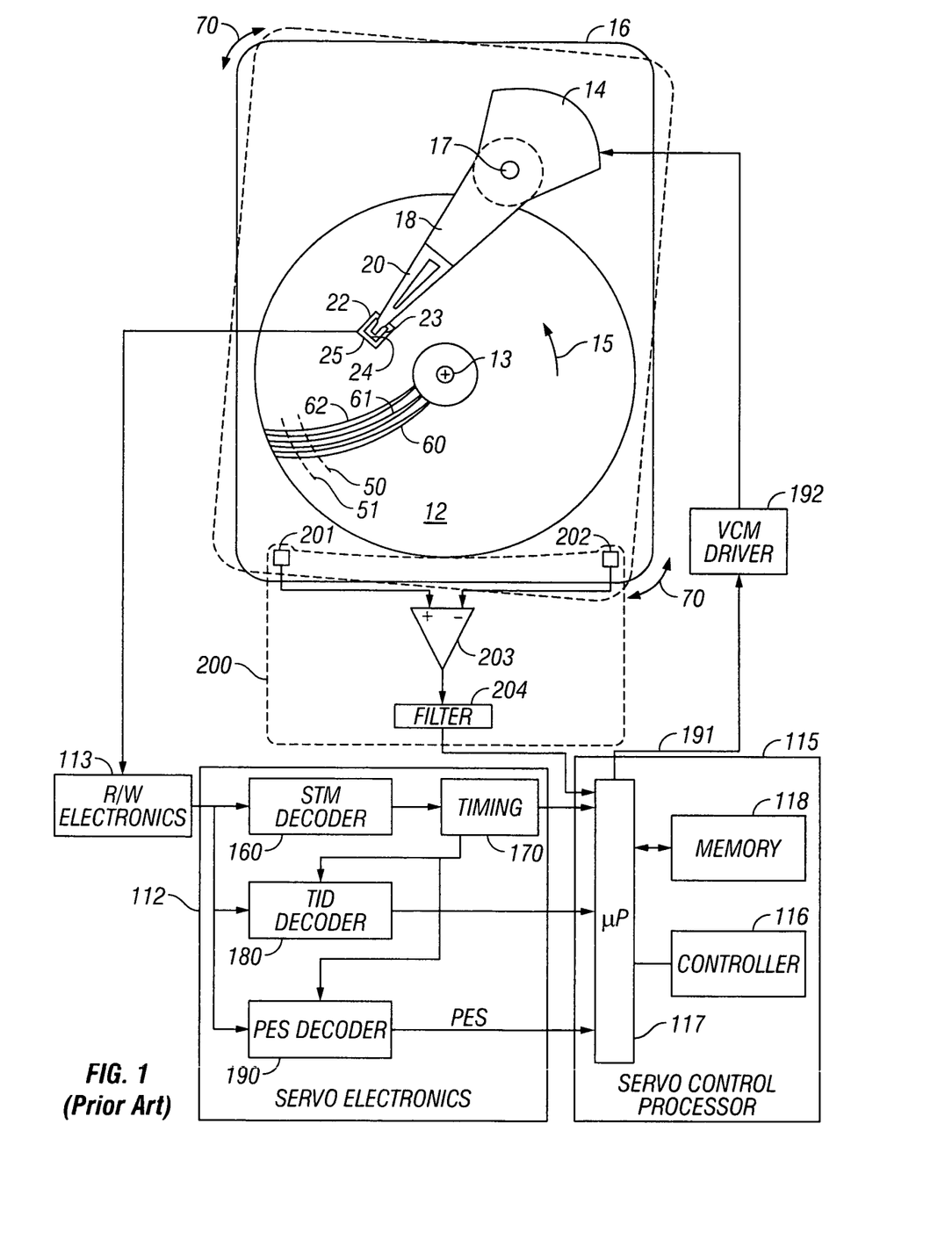
FIG. 1 is a schematic top view of a magnetic recording hard disk drive with a rotational vibration (RV) sensor and feedforward compensation according to the prior art.

FIG. 1 is a block diagram of a magnetic recording HDD according to the prior art. The disk drive includes a magnetic recording disk 12 that is rotated about an axis of rotation 13 in direction 15 by a spindle motor (not shown) mounted to the disk drive housing or base 16. The disk 12 has a magnetic pattern in the recording layer that defines concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM) that indicates the start of the servo sector, a track identification (TID) code, and a portion of a pattern of magnetized blocks or high-frequency bursts that are decoded to provide a head position error signal (PES).

The disk drive also includes an actuator 14, such as a rotary voice coil motor (VCM) type of actuator, supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 113. The servo electronics 112 receives input from R/W electronics 113 and provides digital signals to servo control processor 115. The servo control processor 115 provides an output 191 to VCM driver 192 that controls current to the VCM 14 to move the read/write head 24 to the desired data track and maintain it on track for reading and writing of data.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes a position error signal (PES) to servo control processor 115.

The servo control processor 115 includes a microprocessor 117 that uses the PES as input to a control algorithm to generate the control signal 191 to VCM driver 192. The control algorithm is a feedback "controller" 116, which includes program instructions and a set of parameters based on the static and dynamic characteristics of the "plant" being controlled, i.e., the VCM 14. The control algorithm is essentially a matrix multiplication algorithm, and the feedback controller parameters are coefficients used in the multiplication.

The disk drive is subject to rotational disturbances, as shown by arrows 70, that arise both internally, such as from motion of the VCM 14, and externally, such as from shocks to the frame supporting the disk drive or from the movement of other disk drives when the drives are mounted together in a disk array system. These disturbances cause track misregistration (TMR) of the read/write heads. Thus it is known to incorporate into the disk drive a rotational vibration (RV) sensor 200 that detects rotational disturbances. RV sensor 200 may be a rotational accelerometer, shown as two linear accelerometers 201, 202, each attached to a respective side of base 16. The linear accelerometers 201, 202 are commercially available two-axis piezoelectric accelerometers, such as Murata Model PKGS-00LD accelerometers. The accelerometer is shown schematically as being attached directly to the base 16, but it may also be attached to a printed circuit board or card (not shown) that contains the disk drive electronics, which is secured to the base 16. The rotational accelerometer may also be a single-piece angular accelerometer. Other types of rotational accelerometers are commercially available from STMicroelectronics and Delphi.

The difference in output of the two linear accelerometers 201, 202 is summed at differential amplifier 203, so that together the linear accelerometers and the differential amplifier 203 function as a rotational accelerometer. The output of differential amplifier 203 is passed through a conditioning filter 204 and then to microprocessor 117. The servo control processor 115 uses the signal from RV sensor 200 to cancel the off-track motion induced by rotational vibration through a feedforward control method that creates a compensation signal that is used to provide the input 191 to the VCM driver 192. The feedforward controller is calculated by the microprocessor 117 using parameters and program instructions stored in memory 118. It is also well known in the art that the feedforward controller may be implemented with analog circuitry that converts the signal from the RV sensor to the compensation signal, with the compensation signal then being summed with the control signal to the VCM driver 192 after the servo control processor has calculated the control signal.

Figure 2:
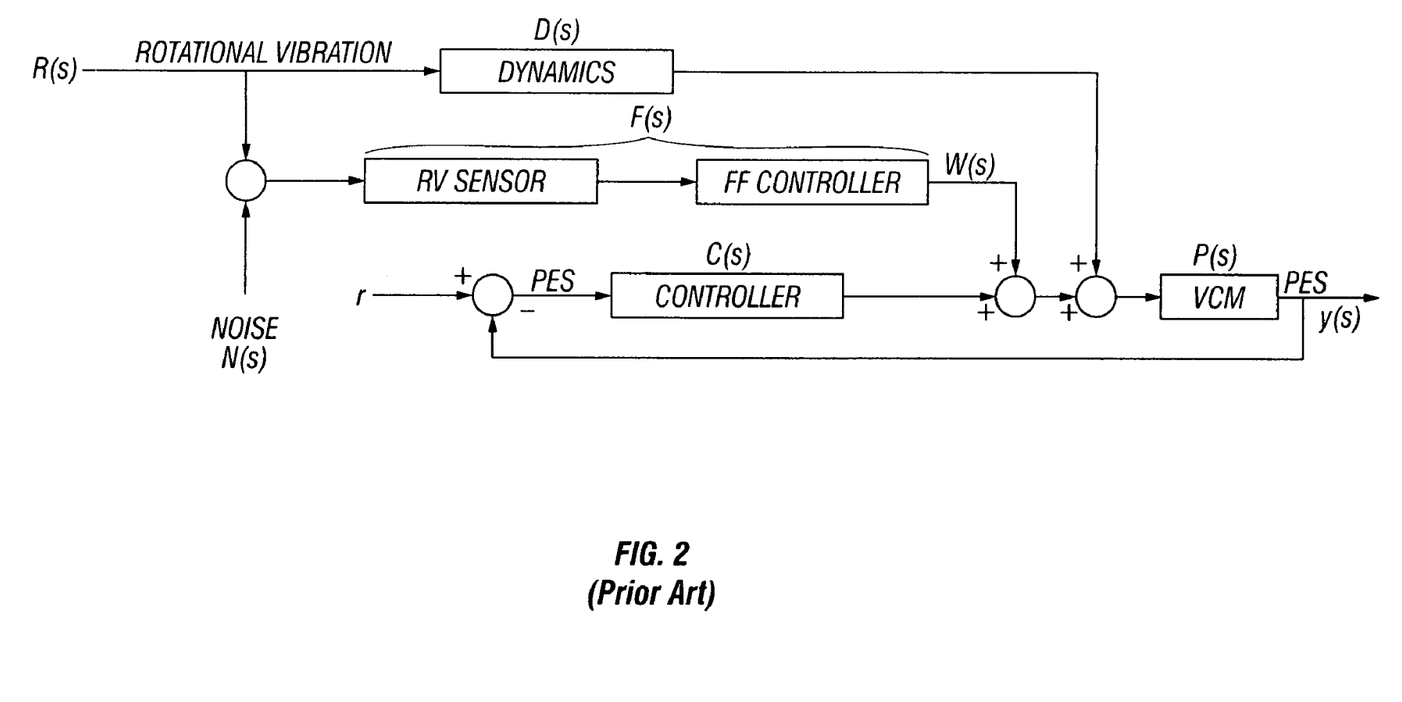
FIG. 2 is the control system loop for the prior art system of FIG. 1.

The control system loop is shown in FIG. 2. P(s) is the VCM actuator or "plant" transfer function, where s is the LaPlace transform variable. This transfer function is known from modeling (e.g., finite element modeling) during the disk drive design process, verified through standard frequency response measurement techniques during the disk drive testing process, and can be tested on each individual disk drive during manufacturing or recalibration operations. C(s) represents the VCM feedback controller transfer function, which is determined during the disk drive design process. It can also be verified through standard frequency response measurement techniques during testing process, and can also be tested on each individual disk drive during manufacturing or recalibration operations. The rotational vibration R(s) affects the disk drive dynamics D(s) and thus creates a disturbance added to the control signal to the VCM. However, the RV sensor detects the rotational vibration and the feedforward controller compensates for the disturbance by generating a compensation signal W(s) that is summed with the VCM control signal from the VCM controller. The feedforward controller may be implemented in analog circuitry, but is more commonly calculated by the servo control processor. F(s) represents the feedforward controller transfer function. Thus W(s)=R(s)F(s), and with the RV feedforward compensation the actual PES is given by:

$$y(s) = \frac{P(s)}{1 + P(s)C(s)}(D(s)R(s) + F(s)R(s)) \qquad \text{Equation (1)}$$

As shown in FIG. 2, the RV sensor is also subject to noise input. When the RV sensor output includes a large amount of noise not related to the rotational vibration, the RV compensation may degrade the PES. Source of noise in the RV sensor output may be electrical or sensor-related. Examples of sensor-related noise include non-rotational vibrations detected by the sensor's cross-axis sensitivity, and/or spurious signals generated as a result of physical distortion of the sensor itself. In addition, when the RV sensor uses a pair of linear accelerometers, like 201, 202 in FIG. 1, the gain mismatch of the two accelerometers also creates an undesirable compensation signal and degrades the PES.

The optimal feedforward controller design is generally unrealizable, due to delays in the system and non-minimum phase zeros in the actuator dynamics. Therefore a compromise must be made in the controller design such that the realizable feedforward controller fits well at frequencies with large disturbances and has more error at frequencies where there are fewer disturbances. However, a problem arises when disk drives with the same single feedforward controller design are placed in different operating environments. For example, the disturbances experienced by a server-class drive in one storage subsystem may be quite different from disturbances in another model of storage subsystem. Even different locations in the same subsystem or removal and re-installation of the drive may change the disturbance characteristics.

Figure 3:
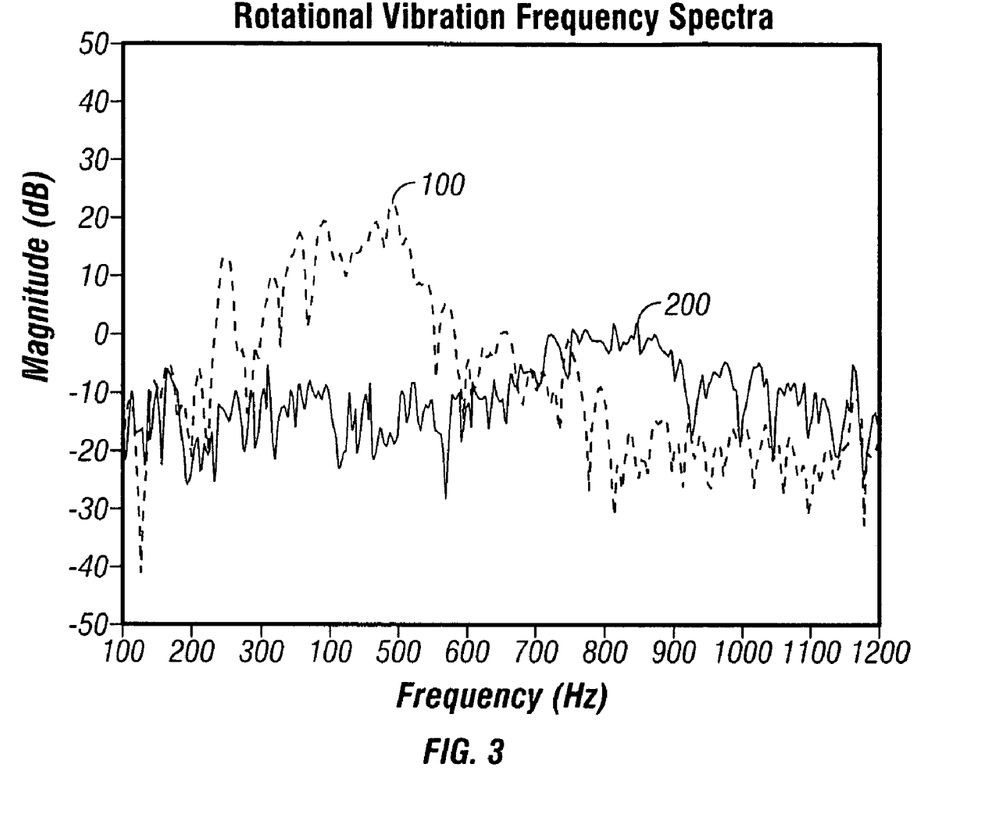
FIG. 3 is the RV frequency spectra for two different disk drive systems.

FIG. 3 shows examples of the measured RV spectra for two different subsystems in which the disk drive is mounted. System #1 has relatively large amplitude vibrations that are largest around 500 Hz, as shown by RV spectrum 100. System #2 has lower amplitude vibrations that are largest around 800 Hz, as shown by RV spectrum 200. FIG. 3 illustrates that if the disk drive has a single feedforward controller, it will have to be a compromised design that results in less than optimal rejection for both RV spectra 100 and 200.

Figure 4:
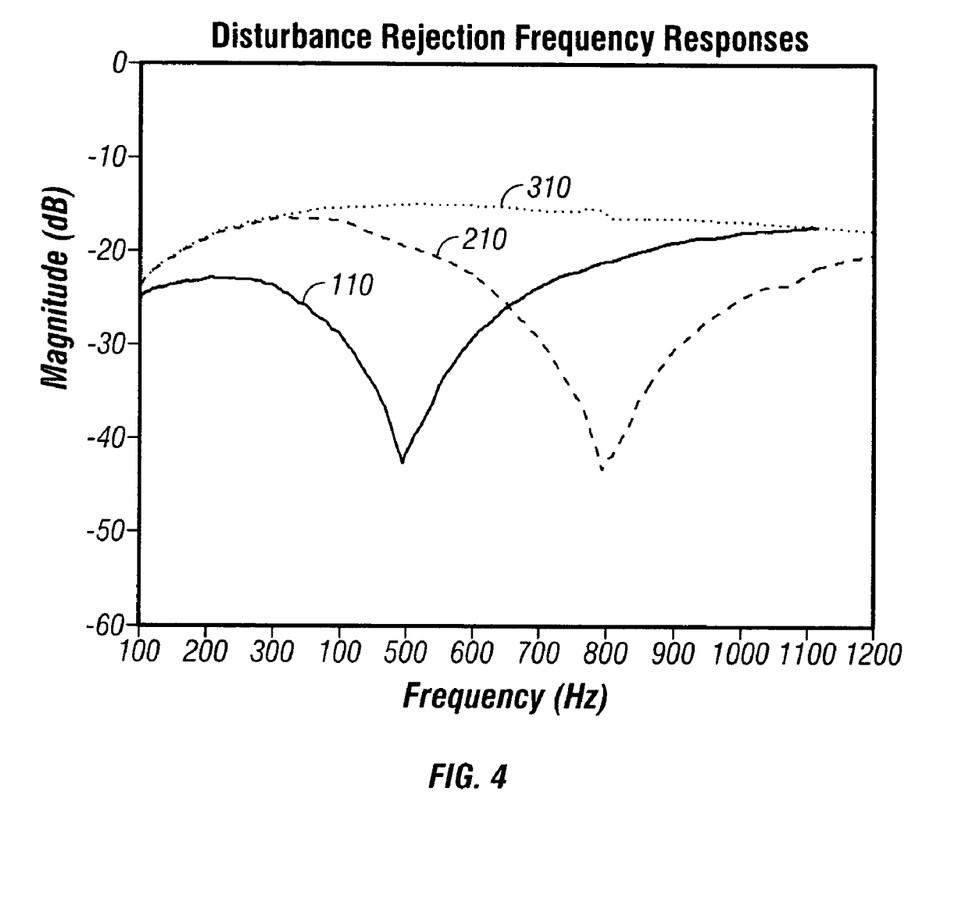
FIG. 4 is the RV rejection frequency response for two different feedforward controllers compared to the case without feedforward compensation.

The disk drive according to this invention has multiple feedforward controllers, each associated with a RV spectrum. Each feedforward controller is a set of parameters stored in memory and accessible by the processor for calculating a compensation signal. The feedforward controller associated with the RV spectrum that most closely matches the actual RV disturbance is then selected and used to generate the compensation signal to be summed with the VCM control signal. FIG. 4 shows the disturbance rejection for two different feedforward controller designs. Design #1, shown by line 110, is optimized for System #1 having the RV spectrum 100 (FIG. 3) and Design #2, shown by line 210, is optimized for System #2 having the RV spectrum 200 (FIG. 3). Both are compared to the disturbance rejection without feedforward compensation (line 310). Designs #1 and #2 in FIG. 4 each show maximum disturbance attenuation at a single frequency, at approximately 500 Hz for Design #1 and at approximately 800 Hz for Design #2.

Figure 5:
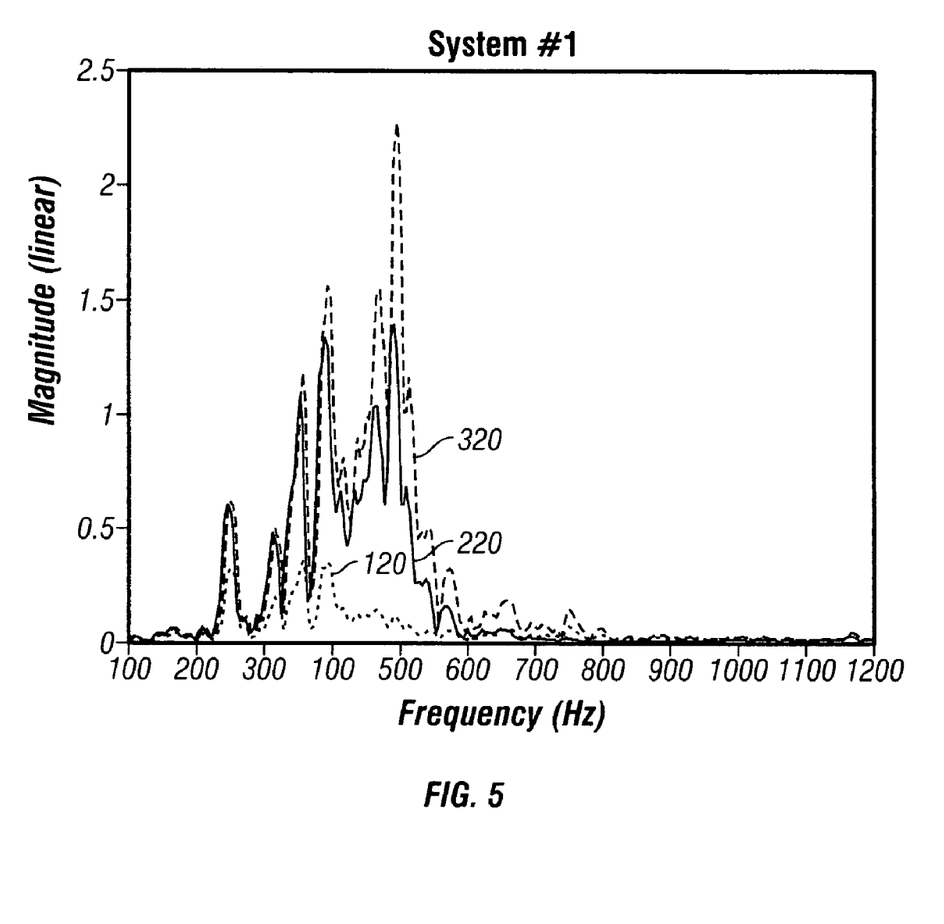
FIG. 5 is the PES power spectra for two different feedforward controllers compared to the case without feedforward compensation for the disk drive in a first system.
Figure 6:
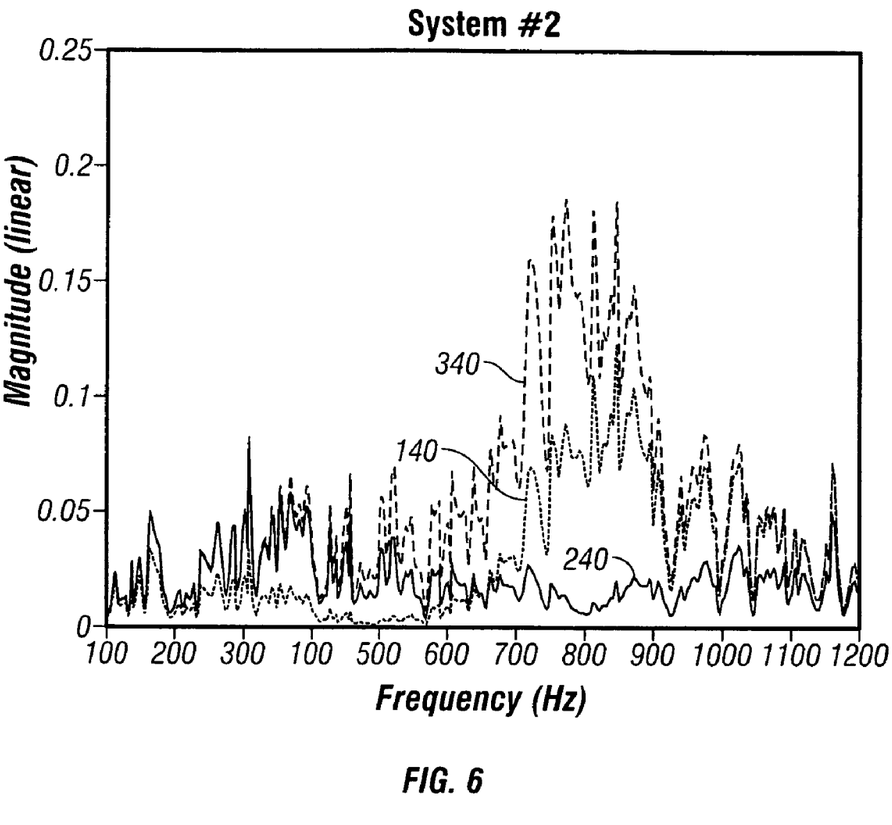
FIG. 6 is the PES power spectra for the same two feedforward controllers as in FIG. 5 compared to the case without feedforward compensation for a disk drive in a second system different from the system of FIG. 5.
Figure 7:
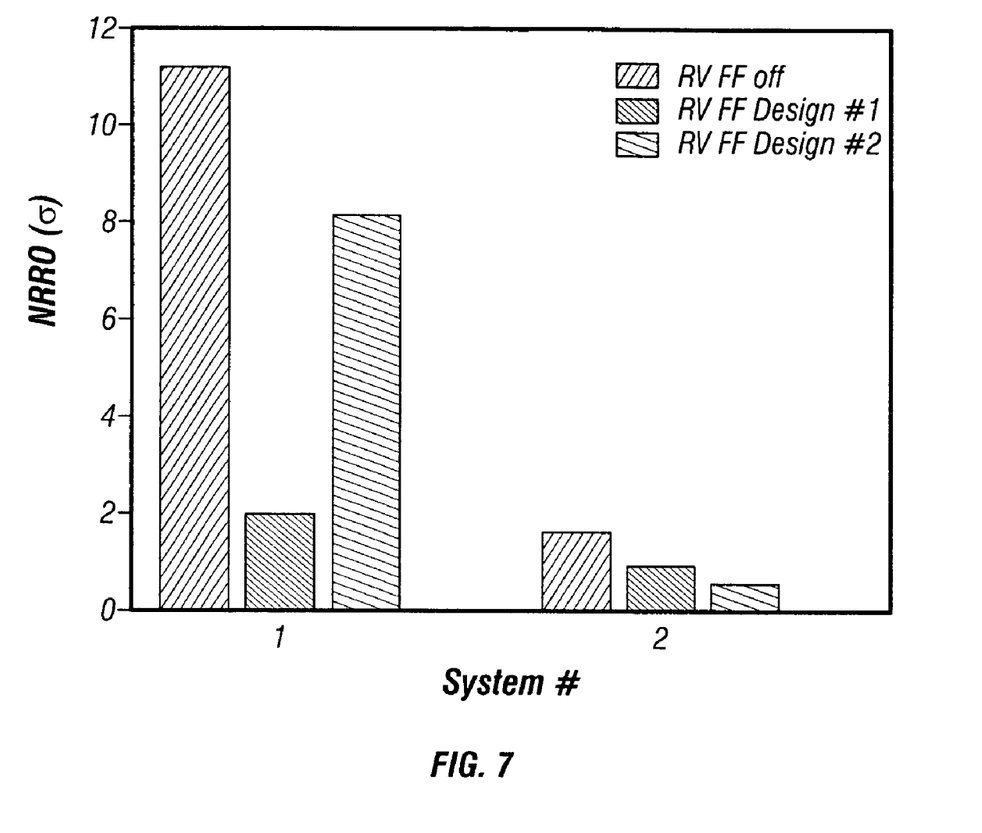
FIG. 7 is the PES standard deviation for the same two feedforward controllers for each a disk drive in each of the two systems compared to the case without feedforward compensation for each system.

FIG. 5 shows a simulation result based on measured data when both feedforward controller Designs #1 and #2 are applied to System #1. Although both feedforward controller designs are better than the case without the feedforward control (line 320), Design #1 (line 120), which was optimized for System #1, clearly works better on System #1 than Design #2 (line 220). FIG. 6 shows the same type of simulation for System #2. Again, both feedforward controller designs are better than the case without feedforward control (line 340), but Design #2 (line 240), which was optimized for System #2, performs better than Design #1 (line 140). This is further emphasized in FIG. 7, which shows the PES standard deviation for the six cases in FIGS. 5 and 6. As expected from the higher magnitude of the disturbance levels for System #1, as shown in FIG. 3, the PES is higher for the three cases in System #1 than for the corresponding three cases in System #2. However, for each of System #1 and System #2, the feedforward controller design that was optimized for that system shows the lowest levels of PES, and thus the best performance.

Figure 8:
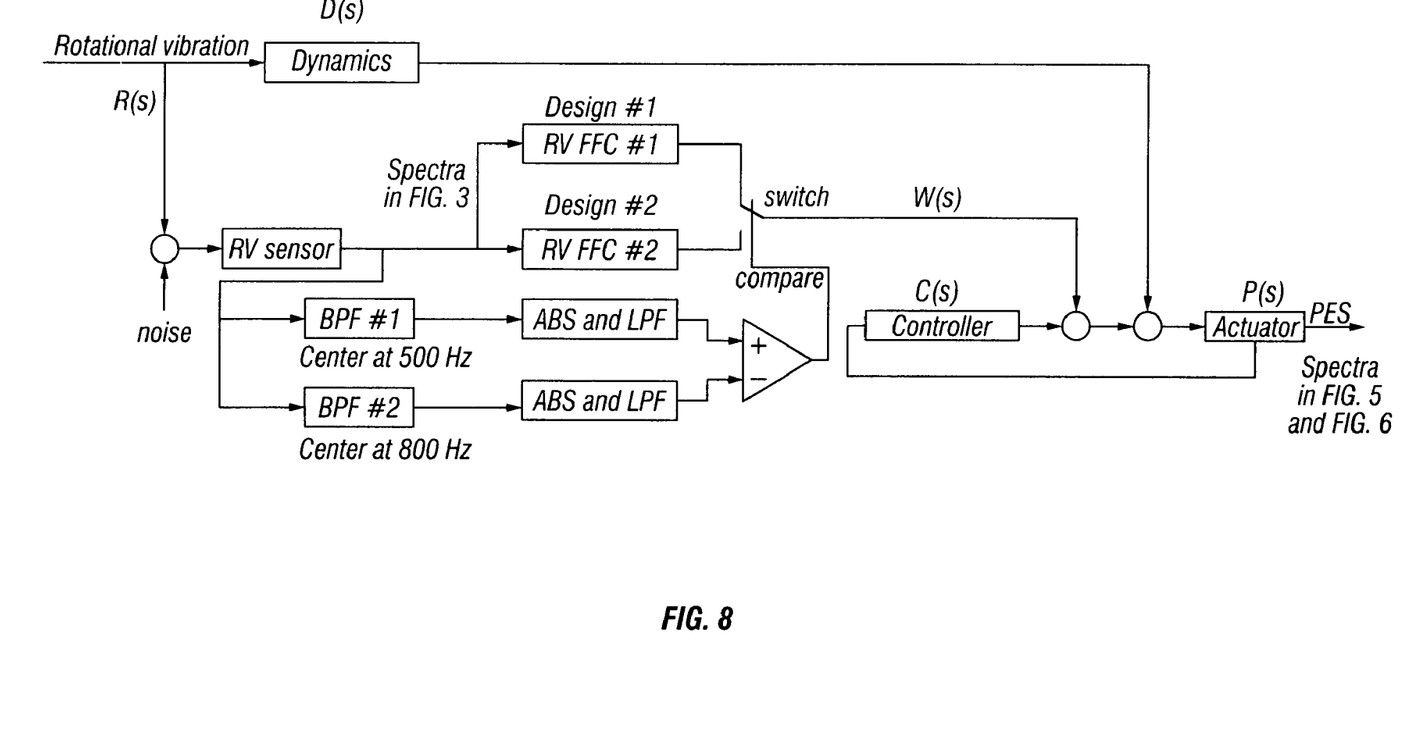
FIG. 8 is a control system loop for illustrating one method of selecting which of two feedforward controllers should be selected, when the invention has two feedforward controllers.

FIG. 8 is a control system loop for illustrating one method of selecting which of the two feedforward controllers (Design #1 or Design #2) should be selected, when the invention has two feedforward controllers. The RV sensor output is directed to two different bandpass filters (BPF1 and BPF2). BPF1 has a center frequency near the center of the RV spectrum for System #1 and BPF2 has a center frequency near the center of the RV spectrum for System #2. The bandpass filter outputs are sent to a comparator. As shown in FIG. 8 the absolute values (ABS) of the RV sensor signals are used in the comparison. Also, the RV sensor signals may optionally be filtered, as shown by low-pass filters (LPFs), to remove resonances known to be unrelated to rotational disturbances. The comparator output controls the selection of which feedforward controller (Design #1 or Design #2) is used. Thus, for Example, if the actual RV acting on the disk drive most closely matches the RV spectrum of System #1, with a center frequency around 500 Hz, then the output from BPF1 would be greater than the output from BPF2 and feedforward controller Design #1 would be selected. The parameter set associated with that feedforward controller would be recalled from memory and used by the processor to calculate the compensation signal to be summed with the VCM control signal.

Figure 9:
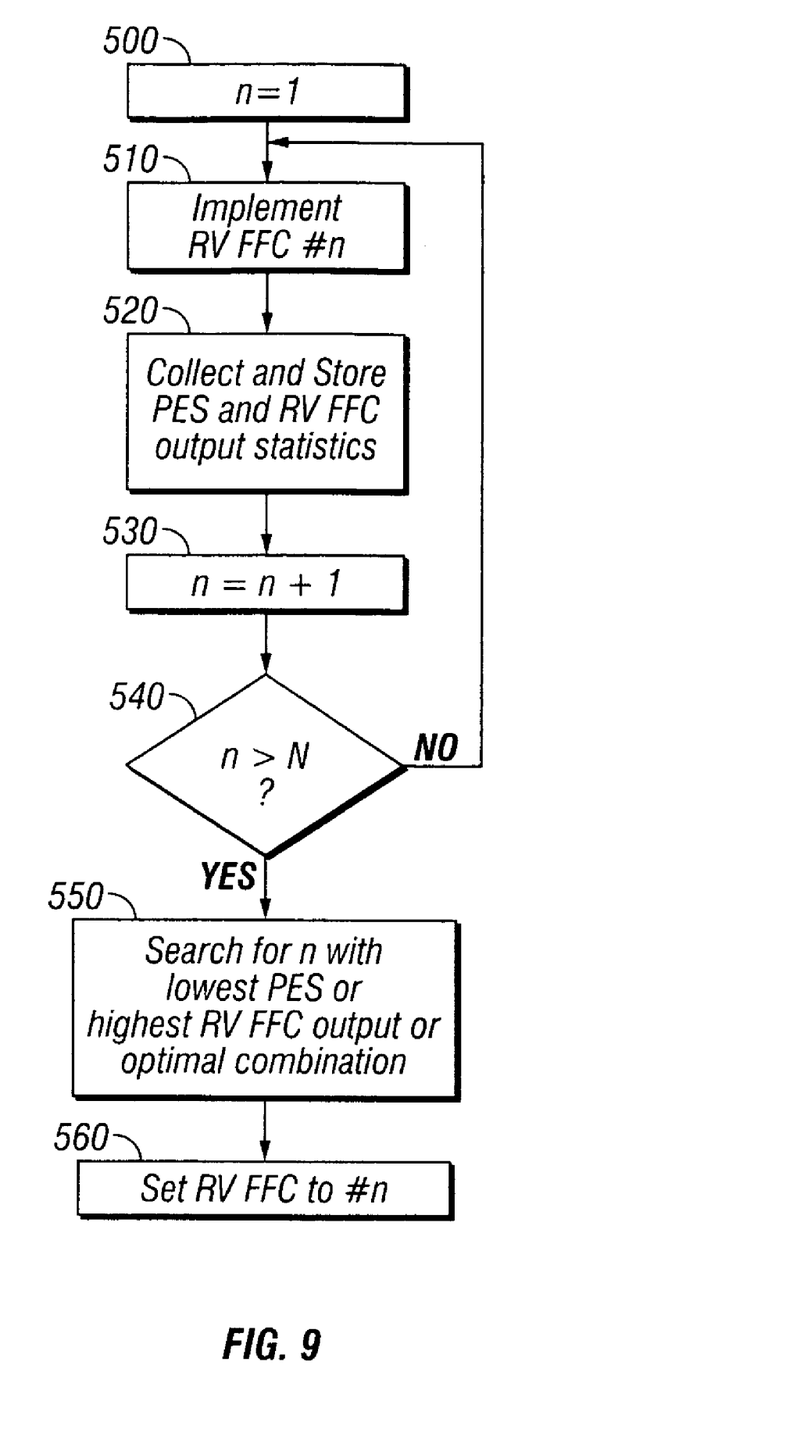
FIG. 9 is a flow chart showing the method for selecting the optimal feedforward controller from a plurality of N feedforward controllers.

In one embodiment of the invention there are N feedforward controllers, each having a design optimized to attenuate an associated RV spectrum. The feedforward controller that is selected is the one that has the design to attenuate the RV spectrum that most closely matches the actual RV disturbance acting on the disk drive. This selection occurs in real time and is based on the RV sensor output or the PES. FIG. 9 is a flow chart illustrating a trial and error approach for selecting a feedforward controller from among N feedforward controllers. In block 500, the method is initiated when n is set to 1, and in block 510 the nth of the N feedforward controllers is implemented when the processor recalls the nth feedforward controller parameter set from memory and runs the feedforward controller algorithm to calculate the nth compensation signal. In block 520, the PES and the nth feedforward controller output (the compensation signal) are stored in memory. The stored values are the PES and compensation signal that result when the disk drive is experiencing an actual external disturbance and the disturbance is being compensated by the nth feedforward controller. The stored values may be the average, root-mean-square (RMS) or some other statistical measurement taken over multiple samples of the PES and compensation signal. In block 530, the counter is incremented and the next feedforward controller (feedforward controller n+1) is implemented and the corresponding PES and feedforward controller output are stored in memory. This continues until all N feedforward controllers have been tested (block 540) in the presence of the actual external disturbance. In block 550 the processor then searches the stored values to find the feedforward controller associated with the RV spectrum that most closely matches the actual RV disturbance acting on the disk drive. This may be the feedforward controller that produced the smallest PES value or the largest compensation signal, or some combination of PES value and compensation signal. This feedforward controller is then selected and used as the feedforward controller (block 560).

Figure 10:
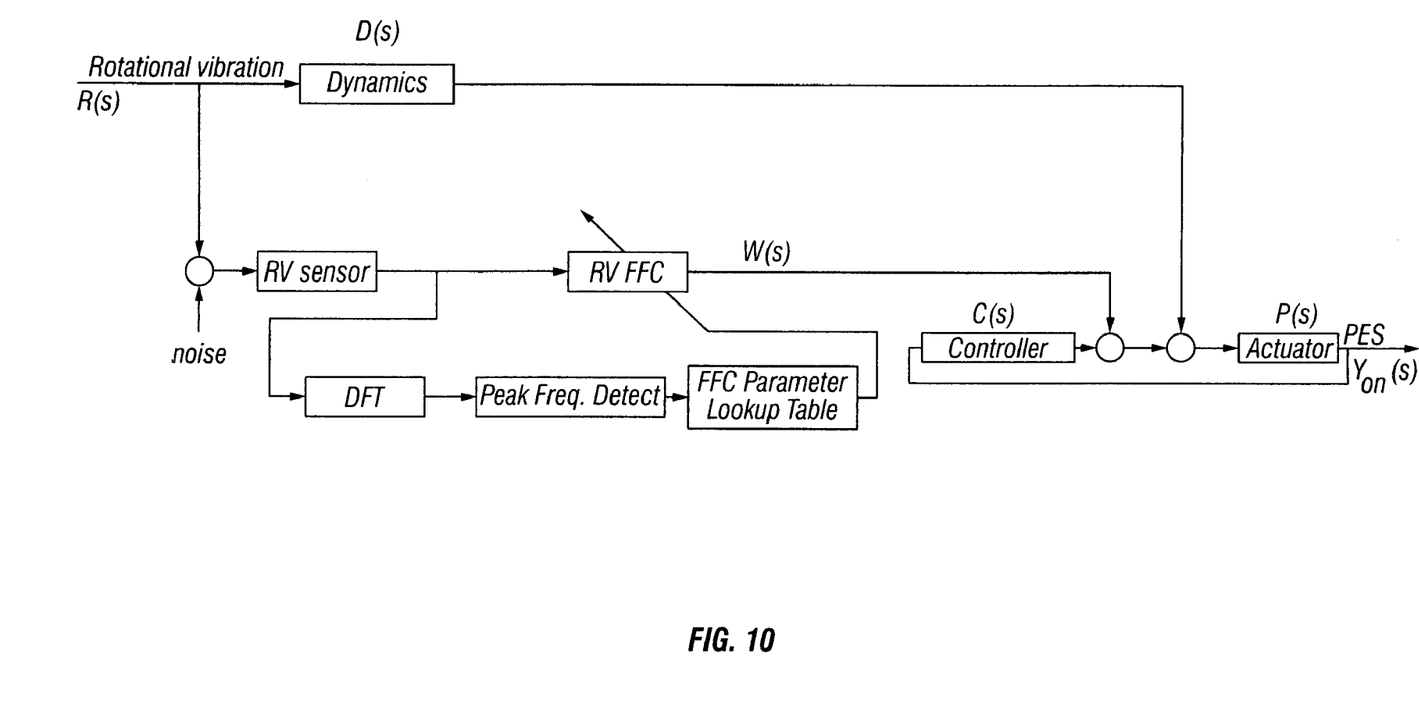
FIG. 10 is a control system loop showing an embodiment wherein the peak frequency of the external disturbance is detected and used to determine which feedforward controller is to be selected.

FIG. 10 is a control system loop showing an embodiment wherein the peak frequency of the external disturbance is detected and used to determine which feedforward controller is to be selected. The RV sensor signal is sampled, a discrete Fourier transform (DFT) is performed by the processor and the peak frequency is detected from the DFT. The disk drive has a plurality of feedforward controllers, each associated with an RV spectrum having a peak frequency. The peak frequency values are stored in a lookup table in memory. After the peak frequency of the external disturbance is detected, the processor selects the appropriate feedforward controller by finding the closest match to the detected peak frequency in the peak frequency lookup table. The feedforward controller associated with this peak frequency is the selected feedforward controller. The processor then recalls the stored parameter set associated with the selected feedforward controller and performs the calculations to generate the compensation signal.

Because most disk drives use rotary actuators that are typically sensitive to RV, the invention has been described as a disk drive with multiple selectable feedforward controllers for compensating primarily RV external disturbances. However, the invention is also applicable when the disk drive is exposed to non-RV external disturbances, such as linear vibrations and various types of shocks.

The invention has been described as implemented in a magnetic recording HDD. However, the invention is applicable to other types of disk drives, such as optical disk drives, for example, CD and digital versatile disk (DVD) types of read-only and writable disk drives, that use optical disks and optical read or read/write heads.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for operating a disk drive, the disk drive including (a) a rotatable magnetic recording disk having a plurality of concentric data tracks containing servo positioning information; (b) a recording head movable across the disk, the head being capable of reading data and servo positioning information in the data tracks; (c) an actuator for moving the head; (d) a disturbance sensor for sensing external disturbances to the disk drive; (e) a servo control processor responsive to a position error signal (PES) from the servo positioning information for generating an actuator control signal; and (f) a plurality of feedforward controllers, each feedforward controller generating a compensation signal to be summed with the actuator control signal for substantially canceling an external disturbance having a predefined spectrum; the processor-implemented method comprising:

determining which of said plurality of predefined disturbance spectra most closely matches the actual external disturbance acting on the disk drive;

selecting the feedforward controller associated with said determined predefined disturbance spectrum; and summing the compensation signal from said selected feedforward controller with the actuator control signal.

2. The method of claim 1 wherein each predefined disturbance spectrum has an associated peak frequency and wherein determining which of said plurality of predefined disturbance spectra most closely matches the actual external disturbance comprises detecting the peak frequency of the disturbance sensor signal.

3. The method of claim 2 wherein detecting the peak frequency of the disturbance sensor signal comprises performing a discrete Fourier transform of the disturbance sensor signal.

4. The method of claim 2 wherein detecting the peak frequency of the disturbance sensor signal comprises measuring the output of the disturbance sensor signal from each of a plurality of bandpass filers associated with the plurality of predefined disturbance spectra, and wherein selecting the feedforward controller comprises selecting the feedforward controller associated with the bandpass filter having the largest output.

5. The method of claim 4 further comprising filtering the output of the disturbance sensor signal from each of a plurality of bandpass filers at a frequency corresponding to a resonant frequency induced by a non-rotational disturbance to the disk drive.

6. The method of claim 1 wherein there are N feedforward controllers and N associated predefined disturbance spectra; wherein determining which of the N predefined disturbance spectra most closely matches the actual external disturbance comprises successively measuring the compensation signal from each of the N feedforward controllers in response to the actual disturbance and storing the N measured compensation signals; and wherein selecting the feedforward controller comprises selecting the feedforward controller that generated the greatest compensation signal of the N stored compensation signals.

7. The method of claim 6 wherein measuring the compensation signal comprises calculating a statistical measurement from multiple compensation signal samples from each feedforward controller.

8. The method of claim 1 wherein there are N feedforward controllers and N associated predefined disturbance spectra; wherein determining which of the N predefined disturbance spectra most closely matches the actual external disturbance comprises successively summing the compensation signal from each of the N feedforward controllers with the actuator control signal, measuring the PES in response to the actual disturbance for each of the N feedforward controllers and storing the N measured PES values; and wherein selecting the feedforward controller comprises selecting the feedforward controller that resulted in the smallest of the N stored PES values.

9. The method of claim 8 wherein measuring the PES comprises calculating a statistical measurement from multiple PES samples for each feedforward controller.

10. A method for operating a disk drive, the disk drive including (a) a rotatable magnetic recording disk having a plurality of concentric data tracks containing servo positioning information; (b) a recording head movable across the disk, the head being capable of reading data and servo positioning information in the data tracks; (c) an actuator for moving the head; (d) a rotational vibration (RV) sensor for sensing rotational vibration of the disk drive; (e) a servo control processor responsive to a position error signal (PES) from the servo positioning information for generating an actuator control signal; (f) memory associated with the processor; and (g) N feedforward controllers stored in memory, each feedforward controller comprising a set of parameters for calculating a compensation signal to be summed with the actuator control signal for substantially canceling an RV having a predefined RV spectrum; the processor-implemented method comprising:

determining which of N predefined RV spectra most closely matches the actual external RV acting on the disk drive;

selecting the feedforward controller associated with said determined predefined RV spectrum; and summing the compensation signal from said selected feedforward controller with the actuator control signal.

11. The method of claim 10 wherein each predefined RV spectrum has an associated peak frequency and wherein determining which of N predefined RV spectra most closely matches the actual external RV comprises measuring the peak frequency of the RV sensor signal.

12. The method of claim 11 wherein measuring the peak frequency of the RV sensor signal comprises performing a discrete Fourier transform of the RV sensor signal.

13. The method of claim 11 wherein measuring the peak frequency of the RV sensor signal comprises measuring the output of the RV sensor signal from each of N plurality of bandpass filers associated with the N predefined RV spectra, and wherein selecting the feedforward controller comprises selecting the feedforward controller associated with the bandpass filter having the largest output.

14. The method of claim 10 wherein determining which of the N predefined RV spectra most closely matches the actual external RV comprises successively measuring the compensation signal from each of the N feedforward controllers in response to the actual RV and storing the N measured compensation signals; and wherein selecting the feedforward controller comprises selecting the feedforward controller that generated the greatest compensation signal of the N stored compensation signals.

15. The method of claim 14 wherein measuring the compensation signal comprises calculating a statistical measurement from multiple compensation signal samples from each feedforward controller.

16. The method of claim 10 wherein determining which of the N predefined RV spectra most closely matches the actual external RV comprises successively summing the compensation signal from each of the N feedforward controllers with the actuator control signal, measuring the PES in response to the actual RV for each of the N feedforward controllers and storing the N measured PES values; and wherein selecting the feedforward controller comprises selecting the feedforward controller that resulted in the smallest of the N stored PES values.

17. The method of claim 16 wherein measuring the PES comprises calculating a statistical measurement from multiple PES samples for each feedforward controller.

18. The method of claim 10 wherein summing the compensation signal from said selected feedforward controller with the actuator control signal comprises calculating the compensation signal from the stored parameter set associated with said selected feedforward controller.

19. A magnetic recording disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a rotational vibration (RV) sensor for sensing rotational vibration of the disk drive; (e) a servo control processor; (f) memory associated with the processor; (g) N feedforward controllers stored in memory, each feedforward controller comprising a set of parameters for calculating a compensation signal to be summed with the VCM control signal for substantially canceling an RV having a predefined RV spectrum; and (f) a program of instructions stored in memory and readable by the processor for undertaking method acts comprising:

receiving a RV sensor signal from the RV sensor and a position error signal (PES) from the servo positioning information;

calculating a VCM control signal from the PES;

determining which of N predefined RV spectra most closely matches the actual external RV acting on the disk drive;

calculating a compensation signal from the stored parameter set for the feedforward controller associated with said determined predefined RV spectrum; and summing the calculated compensation signal with the VCM control signal.

20. The disk drive of claim 19 wherein each predefined RV spectrum has an associated peak frequency and wherein determining which of N predefined RV spectra most closely matches the actual external RV comprises measuring the peak frequency of the RV sensor signal.

21. The disk drive of claim 19 wherein determining which of N predefined RV spectra most closely matches the actual external RV comprises successively measuring the compensation signal from each of the N feedforward controllers in response to the actual RV and storing the N measured compensation signals in memory; and wherein calculating a compensation signal comprises calculating a compensation signal from the stored parameter set for the feedforward controller that generated the greatest compensation signal of the N stored compensation signals.

22. The disk drive of claim 19 wherein determining which of N predefined RV spectra most closely matches the actual external RV comprises successively summing the compensation signal from each of the N feedforward controllers with the VCM control signal, measuring the PES in response to the actual RV for each of the N feedforward controllers and storing the N measured PES values; and wherein calculating a compensation signal comprises calculating a compensation signal from the stored parameter set for the feedforward controller that resulted in the smallest of the N stored PES values.

* * * * *